(12) United States Patent
Thomas et al.

(10) Patent No.: US 7,951,210 B2
(45) Date of Patent: May 31, 2011

(54) SUPPORT-COLOURING MEANS

(75) Inventors: Daniel Thomas, Villers/Coudun (FR); Catherine Bedel-Cloutour, Verberie (FR); Sylviane Pulvin-Houde, Compiègne (FR); Laurent Bedouet, Le Mans (FR)

(73) Assignees: Doublet Luc, Seclin (FR); Doublet, Avelin (FR)

( * ) Notice: Subject to any disclaimer, the term of this patent is extended or adjusted under 35 U.S.C. 154(b) by 703 days.

(21) Appl. No.: 11/596,370

(22) PCT Filed: May 13, 2005

(86) PCT No.: PCT/FR2005/001216
§ 371 (c)(1),
(2), (4) Date: Nov. 19, 2007

(87) PCT Pub. No.: WO2005/115613
PCT Pub. Date: Dec. 8, 2005

(65) Prior Publication Data
US 2008/0313823 A1    Dec. 25, 2008

(30) Foreign Application Priority Data

May 14, 2004  (FR) .................................. 04 05305

(51) Int. Cl.
| | |
|---|---|
| *D06P 5/20* | (2006.01) |
| *D06P 1/00* | (2006.01) |
| *C09B 67/00* | (2006.01) |
| *A01H 5/02* | (2006.01) |
| *C12N 9/00* | (2006.01) |
| *C12N 9/99* | (2006.01) |
| *A61K 35/14* | (2006.01) |
| *C07K 1/00* | (2006.01) |
| *C07K 14/00* | (2006.01) |
| *C07K 17/00* | (2006.01) |
| *C12N 9/02* | (2006.01) |
| *C12N 9/14* | (2006.01) |

(52) U.S. Cl. ......... 8/444; 8/401; 8/636; 8/147; 435/183; 435/184; 435/189; 435/195; 530/385

(58) Field of Classification Search ............ 8/444, 401, 8/636, 147; 422/55; 436/66–67, 166; 435/183, 435/184, 189, 195; 530/385
See application file for complete search history.

(56) References Cited

U.S. PATENT DOCUMENTS

| 2,623,821 | A | * | 12/1952 | Isherwood et al. ........... 430/142 |
|---|---|---|---|---|
| 3,654,180 | A | * | 4/1972 | Bauer .............................. 435/28 |
| 4,149,847 | A | * | 4/1979 | Balland ............................ 8/552 |
| 4,373,932 | A | * | 2/1983 | Gribnau et al. ............... 436/501 |
| 5,281,523 | A | | 1/1994 | Kovach |
| 5,908,472 | A | * | 6/1999 | Vollmond ........................ 8/102 |
| 2001/0028889 | A1 | * | 10/2001 | Breton et al. ................ 424/401 |
| 2004/0022839 | A1 | * | 2/2004 | Barnikol ....................... 424/450 |

FOREIGN PATENT DOCUMENTS

| EP | 0 504 005 | 9/1992 |
|---|---|---|
| EP | 1 342 831 | 9/2003 |

OTHER PUBLICATIONS

Jelenc et al. High yield photoreagents for protein crosslinking and affinity labeling. Biochemistry. Mar. 20, 1978, pp. 3564-3568.*
Elbaum et al. Some properties of the reaction site for the esterase activity of hemoglobin. The Journal of Biological Chemistry. Jul. 1982. pp. 8454-8458.*
International Search Report for PCT/FR2005/001216 dated Sep. 30, 2005 (English and French).
Conyers et al., *Chromogenic Substrates for Horseradish Peroxidase*, Analytical Biochemistry, vol. 192, 1991, pp. 207-211, XP001042397.

* cited by examiner

*Primary Examiner* — Lorna M Douyon
*Assistant Examiner* — Tanisha Diggs
(74) *Attorney, Agent, or Firm* — Nixon & Vanderhye P.C.

(57) ABSTRACT

The invention relates to catalytic systems which are used to generate colors on a support. The inventive means are characterized in that they comprise one or more deactivated oxidation catalysts. The invention can be used to color organic or inorganic supports.

12 Claims, No Drawings

SUPPORT-COLOURING MEANS

This application is the US national phase of international application PCT/FR2005/001216 filed 13 May 2005, which designated the U.S. and claims priority to FR 0405305 filed 14 May 2004, the entire content of each of which are hereby incorporated by reference.

A subject-matter of the present invention is means, products and a process for the coloring of supports which are inorganic or organic materials, in particular living materials, such as the skin.

It is known to print supports, such as paper and fabrics, using inks. This type of technique is currently used by the Applicant Company for carrying out the coloring of supports starting from the three primary colors (yellow, cyan and magenta) supplied by inks, black being obtained using a black ink and white being given by the support itself. The support to be colored is wound off, for example as a sheet, through a printer which distributes, point by point, drops of ink of a few nanoliters according to a prefigured design, advantageously by computer. However, the arm which distributes the inks has to pass the same spot several times in order to obtain the desired intensity, which takes up time.

Furthermore, some chemical inks are regarded as polluting to the environment.

Techniques based on the use of enzymes have also been reported. Thus, patent EP 1 342 831 discloses a process for the coloring of fabrics by the enzymatic route which comprises the dipping of the fabric in an aqueous solution comprising one or more aromatic or heteroaromatic compounds, followed by the dipping of the dipped material in an aqueous solution with a source of hydrogen peroxide and an enzyme exhibiting a peroxidase activity or with an enzyme exhibiting an oxidase activity with regard to said aromatic or heteroaromatic compound(s).

In this process, no control exists of the components fixed during the various dippings of the samples and very particularly of the oxidation catalyst. The latter is bound only by absorption and can thus be removed during washing operations. Furthermore, the colors obtained are not the primary colors.

The inventors have found that these problems could be overcome by replacing these inks and these enzymes by photoactivatable catalytic systems capable of generating the three primary colors, the combination of which can result in colored compounds.

An aim of the invention is thus to provide such systems and a process for the generation of color on a support based on their use, in which the colors are displayed on said support only at the desired moment and at the desired spot.

Another aim of the present invention is based on a process for coloring a support in which said support can be reused several times in order to generate other colors than those initially generated.

The term "support" as used in the description and the claims denotes inorganic or organic materials, in particular living materials, such as the skin.

The catalytic systems used according to the invention for the generation of colors on a support are characterized in that they comprise one or more inactivated oxidation catalysts.

Mention will be made in particular of oxidases, such as peroxidases, laccases and hydrolases, such as alkaline phosphatases or acid phosphatases.

Peroxidase (EC 1.11.1.7) presents itself as a particularly advantageous enzyme in view of its very low specificity with regard to substrates.

Laccase (EC 1.10.3.2) can also be used. Like peroxidase, it catalyzes oxidative coupling reactions using the same substrates.

Alkaline phosphatase (EC 3.1.3.1) and acid phosphatase (EC 3.1.3.2) are completely characterized but their substrates are more limited and more expensive than those of peroxidase, hemoglobin or laccase.

Hemoglobin, in particular bovine hemoglobin, is capable of oxidizing peroxidase substrates: the crosslinking of hemoglobin, targeted at bringing about an amplification phenomenon, makes it possible to approach the performances of peroxidase.

Advantageously, the substrates for these catalysts are numerous and are available at low costs. Their oxidation produces numerous water-insoluble colored compounds (Conyers and Kidwell (1991), $Arial.$ $Biochem.$, 192, 207-211).

Other oxidation catalysts comprise hemoglobins.

Inactivation of these catalysts is satisfactorily brought about by attaching photolabile groups, preferably in their active site.

Appropriate groups correspond to "nitrophenyl" substituents and comprise, for example, an o-nitrobenzyl or nitrophenyl group.

Mention will be made, for example, of 4,5-dimethoxy-o-nitrobenzyl, o-nitrobenzyl-ethyl or o-nitrobenzyl.

In accordance with the invention, the oxidation catalysts are associated with chromogenic substrates used in combination with aromatic compounds.

The term "chromogenic substrate" is understood to mean compounds which operate reversibly with the catalysts and which are capable of resulting in a colored compound after oxidation by the catalyst and condensation with the aromatic compounds.

Generally, the catalytic systems of the invention are systems capable of being photoreactivated and of regaining a sufficient oxidative activity to generate colors.

The substrates described, for example, by Conyers and Kidwell (1991, cited above) are particularly appropriate for obtaining the three primary colors (cyan, magenta and yellow) as they rapidly give insoluble blue and red products precipitating in situ.

Mention will in particular be made of 3-methyl-2-benzothiazolinone hydrazone (MBTH) and of phenylenediamine derivatives, such as dimethylphenylenediamine and diethylphenylenediamine.

Mention will be made, as aromatic compounds which can be used to react with the oxidized chromogenic substrates and to result in a colored precipitate, of chloronaphthols, naphthalenediols, aminophenols, catechols, chlorophenols, phenol, guaiacol or any other molecule belonging either to the family of the mono-, di- or polycyclic aromatic compounds or to the family of the heteroaromatic derivatives.

The invention is also targeted at a process for the generation of colors on a support, characterized in that it comprises the reactivation, under the effect of a light stimulus, of one or more inactivated oxidation catalysts as defined above impregnating said support.

The oxidation catalysts are thus temporarily inactivated in order to make possible the implementation of the invention. Their reactivation will make it possible to generate colors at the desired spot at the desired moment.

Preferably, this process comprises:
 a) a stage of photoreversible inhibition of one or more oxidation catalysts impregnating a support,
 b) a stage of immobilization on a support to be colored of the temporarily inactivated oxidation catalyst or catalysts as obtained on conclusion of stage a), said stage of immobilization being carried out in particular by dipping the support to be colored in a solution comprising the inactivated oxidation catalyst or catalysts, c) a stage of light stimulation of the impregnated support as obtained on conclusion of stage b) which makes it possible to reactivate the temporarily inactivated oxidation catalyst or catalysts, d) a stage of impregnation of the support on which the oxidation catalyst or catalysts have been immobilized on conclusion of stage c) with a solution comprising one or more chromogenic substrates and one or more oxidizing agents, thus making it possible to develop the colors on the support at the spot activated by the light stimulation.

Stage a) is advantageously carried out by reacting the oxidation catalysts employed with compounds including photolabile groups as defined above. Compounds including o-nitrobenzyl groups are particularly advantageous in this regard. This is because these compounds can spontaneously attach by covalent bonding to amino acids, in particular active site, for example lysine, asparagine, glutamine or cysteine units. Use will thus advantageously be made, for attachment to lysines, of a compound such as 3,4-dimethoxy-o-nitrobenzyl chloroformate. The reaction can be carried out in an aqueous medium. For the reaction with units comprising a carboxyl functional group, for example aspartic or glutamic units, a diazoethane derivative is prepared from a hydrazonoethane derivative.

Stage b) comprises the impregnation of a support with the catalyst in solution under conditions which make it possible to obtain the desired intensity for a color.

The support is, for example, a fabric formed of natural fibers, in particular made of cotton, and/or of synthetic fibers, made of a polymeric material, such as a polyester. It can also be paper.

The catalyst solution is advantageously an aqueous solution and includes amounts of catalyst of the order of 5 to 50 µg/ml for HRP and of 50 to 200 µg/ml for Hb with a pH range of 4 to 6 approximately.

Before stage b) of immobilization, a preliminary stage of impregnation of the support to be colored with a solution comprising one or more additives capable of bonding the oxidation catalyst or catalysts to the support to be colored is advantageously carried out.

According to one embodiment of the process of the invention, when the support to be colored is a synthetic fabric, a preliminary stage of impregnation by alginate, in particular calcium alginate, is carried out: the presence of this acidic polysaccharide makes possible the immobilization of a large amount of oxidation catalyst on the fabric by covalent bonding after activation of the carboxyl functional groups to give NHS ester functional groups by the water-soluble carbodiimide [EDCI: N-ethyl-N'-(3-dimethylaminopropyl)carbodiimide, N-cyclohexyl-N'-(2-morpholinoethyl)carbodiimide metho-p-toluenesulfonate]/hydroxysuccinimide (NHS) pair.

In the preliminary stage of impregnation, the alginate present at the surface of the fabric (1 cm$^2$) is activated in water for 5 to 30 min by the EDC/NHS pair (200 µg/200) in a volume varying from 2 to 4 ml approximately.

The activated fabric is immersed in a solution of oxidation catalyst at the concentrations specified previously, the solution being maintained at a pH of 6 to 7. The coupling time varies from 30 to 90 min approximately.

According to another preferred arrangement of the invention, on conclusion of the preliminary stage of activation and of impregnation of the support to be colored with a solution comprising one or more additives, a drying stage is carried out. The drying is advantageously carried out under cold conditions in order not to damage the catalysts.

The light stimulation necessary for the reactivation takes place at 366 nm for 5 to 30 min.

For stage d), the support is impregnated with a solution including one or more chromogenic substrates, which are substrates for the catalyst, one or more aromatic compounds and one or more oxidizing agents.

The concentrations of substrates vary from 1 to 4 mM and the concentrations of oxidizing agents are fixed at 1 mM; the concentrations of each of the members of the pair of substrates vary from 1 to 4 mM approximately. This mixture is produced in a buffered medium of 4.5 to 6 approximately, at a temperature of 20 to 25° C. approximately, until the coloring or colorings develop.

The condensation of the oxidized substrates with the aromatic compounds results in the formation of colored compounds which precipitate in situ at the actual site of the conversion of the precursors (chromogenic substrates).

In order for the support to be colored to remain colorless in the presence of the chromogenic substrates, it is necessary to obtain complete inhibition of the activity of the oxidation catalyst.

The term "complete inhibition" is understood to mean an inhibition varying from approximately 80% to approximately 100% and preferably from approximately 90% to approximately 98%.

The reactivation, even partial, of the oxidation catalyst by photolysis is sufficient to trigger the process for the generation of colors.

The term "partial reactivation" is understood to mean a reactivation varying from approximately 10% to approximately 30% and preferably from approximately 20% to approximately 25%. Thus, a recovery after irradiation of the activity of the catalyst of the order of approximately 25% is sufficient to trigger the process for the generation of colors.

Under the effect of a light stimulus, the photolabile groups are removed by photolysis while leaving the initial target (oxidation catalyst) chemically intact and biologically active. The oxidation catalyst obtained is partially reactivated.

A chemical reaction that involves the aromatic substrate, the completely or partially reactivated oxidation catalyst, an oxidizing agent and the aromatic compound subsequently occurs and results in a colored product being obtained.

There are several advantages to the process of the invention, in particular in comparison with a conventional coloring process using inks. This is because, according to the process of the invention, it is possible to obtain faster coloring of the supports than with point by point printing, a better resolution, the size of the pixel corresponding to the dimension of the immobilized oxidation catalyst, and the problems related to the blocking of ink dispensing heads.

The invention is also targeted at a process in which said system is a flexible and transparent photoenzymatic film for locating in vivo emission "hot spots" of gamma photons in nuclear medicine. The development of a color stain on the film applied to the skin makes it possible, for example, to locate a point of pathological cell growth (for example, sentinel nodes for breast cancer) before a surgical treatment. This process advantageously makes it possible to be freed from the constraints imposed by the use of gamma scintigraphy cameras and to considerably reduce the involvement in routine operations of specialists in nuclear medicine.

The invention is also targeted at a process as defined above in which the support is composed of macromolecules, for example of cellophane, and carries a photoenzymatic system as described above. The face of the film in contact with the skin is grooved in order to act as collimator with regard to the gamma photons.

According to yet another aspect of the invention which is of great interest, the invention is targeted at the application of the process for the generation of colors on the skin in cosmetics.

Other aspects and advantages of the present invention will become apparent in the examples which follow, which illustrate the generation of colors on a support made of cotton or of polyester.

EXAMPLE 1

Use of Hemoglobin

1) Photoreversible Inhibition of Hemoglobin

Bovine hemoglobin in aqueous solution (32 μM) is treated with different concentrations of 1-(2-nitrophenyl)ethyldiazoethane (NPE-diazo) in solution in DMSO at 20° C. for 1 h in darkness. The final concentration of DMSO should not exceed 5%. The NPE-diazo concentrations vary from 50 to 100 equivalents with respect to the hemoglobin. The coupling reaction is halted by addition of a 100 mM acetate buffer solution at pH 4.4 (1 equivalent with respect to NPE-diazo). The contact times vary from 10 to 30 min. The reaction mixture is subsequently dialyzed against water, between 4 and 20° C., between 1 and 16 hours, against 1000 volumes of water. The conjugate is stored at 20° C.

The percentage of inhibition of the oxidation of ABTS [diammonium salt of 2,2'-azinobis(3-ethylbenzothiazolinone-6-sulfonic acid), 1 mM] is determined before dialysis on 96-well microtitration plates (Costar, Corning Incorporated) in sodium acetate buffer, 50 mm, pH 5, in the presence of 1 mM of hydrogen peroxide. The number of molecules attached per hemoglobin molecule is determined by mass spectrometry (electrospray). The results are collated in table 1.

TABLE 1

| NPE-Hemoglobin conjugates | Number of NPE attached/Hb molecule | Residual activity (%) |
|---|---|---|
| Native hemoglobin | 0 | 100 |
| Hb-50* | from 0 to 5 | 12.6 |
| Hb-75* | from 1 to 6 | 5.4 |
| Hb-100* | from 1 to 6 | 2.5 |

*50, 75 and 100 corresponding to the number of NPE equivalents introduced into the reaction medium.

The treatment of hemoglobin with NPE-diazo results in strong inhibition of the oxidative activity (greater than 90%).

2) Photoreactivation of the Oxidation Catalyst

The oxidation catalyst is reactivated by irradiation of the solutions of the various conjugates (1 mg/ml) in sodium acetate buffer (25 mM, pH 4.4). Photolysis takes place at 366 nm (100 W UV lamp, 7 mW/cm² at a distance of 30 cm); the irradiation times vary from 5 to 30 min. This stage is advantageously carried out in the presence of 5 mM of 2-ethanolamine in order to trap possible cross reactions between photolysis products and hemoglobin.

After irradiating for 30 minutes, deprotection of the hemoglobin is complete.

The restoration of the enzymatic activity is determined in microtitration plates as described above in the presence of ABTS (1 mM) and $H_2O_2$ (1 mM).

After irradiating for 30 min, 57% of the activity is recovered for Hb-50, 28% for Hb-75 and 16% for Hb-100. These percentages of activity are sufficient to subsequently trigger the process for the generation of the coloring.

3) Attachment of the Enzymes to the Support to be Colored

The oxidation catalyst, bovine hemoglobin, covalently attaches to the polyester fabrics preimpregnated with calcium alginate.

The carboxyl functional groups of the polysaccharide are activated in water, in the presence of the EDC/NHS pair, for a period of time varying from 10 to 30 min. The amounts of carbodiimide/N-hydroxysuccinimide activators are, per 1 cm² of fabric, 200 μg each in volumes varying from 2 to 4 ml. The fabric, thus activated, is immersed in a solution of oxidation catalyst at a concentration of 50 to 200 μg/ml at pH 6. The incubation time varies from 45 to 90 min.

Under these conditions, the fabric is thus ready to be irradiated in order to reactivate the oxidation catalyst and is then impregnated with the solution comprising the pair(s) of homogeneous substrates.

4) Impregnation by the Pairs of Chromogenic Substrates and the Oxidizing Agent a) Use of the DMPDA/4-chloronaphthol Pair The fabric reactivated above is immersed in a solution, buffered between pH 4.5 and 6, comprising dimethylphenylenediamine (mother solution prepared in water, 110 mM) and 4-chloronaphthol (mother solution prepared in ethanol, 110 mM). Their final concentrations vary from 1 to 4 mM. The oxidizing agent, hydrogen peroxide, is added; its concentration is advantageously fixed at 1 mM. The reaction is carried out between 20 and 25° C. until development of the blue color.

b) Use of the MBTH/4-chloronaphthol Pair

As described above in a), the reactivated fabric is immersed in a solution, buffered between pH 4.5 and 6, comprising 3-methylbenzothiazoline (MBTH, mother solution prepared in water, 110 mM), 4-chloronaphthol and the oxidizing agent. The concentrations of the various entities and the operating conditions are the same as for a). In this case, the red color is generated.

c) Use of the MBTH/1,3-naphthalenediol Pair

As described above in a), the reactivated fabric is immersed in a solution, buffered between pH 4.5 and 6, comprising 3-methylbenzothiazoline (MBTH), 1,3-naphthalenediol (mother solution prepared in ethanol, 110 mM) and the oxidizing agent. The concentrations of the various entities and the operating conditions are the same as for a). In this case, the yellow color is developed.

What is claimed is:

1. A process for the generation of colors on a support, comprising reactivating, under the effect of a light stimulus, of an inactivated hemoglobin as one or more inactivated oxidation catalysts on the support, said inactivated hemoglobin containing at least one photolabile nitrophenyl group, said process comprising:
   a) photoreversibly inhibiting said one or more oxidation catalysts,
   b) immobilizing the one or more oxidation catalyst of (a) on the support to be colored by dipping the support to be colored in a solution comprising the one or more oxidation catalyst to produce a support comprising immobilized inactivated catalyst,
   c) reactivating with light stimulation the immobilized inactivated catalyst of the support comprising immobilized inactivated catalysts,
   d) impregnating the support resulting from (c) with a solution comprising one or more chromogenic substrates, one or more aromatic compounds and one or more oxidizing agents, thus making it possible to develop the colors on the support at the spot activated by the light stimulation.

2. A process for the generation of colors on a support, comprising reactivating, under the effect of a light stimulus, of an inactivated hemoglobin as one or more inactivated oxidation catalysts on the support, said inactivated hemoglobin containing at least one photolabile nitrophenyl group, said process further comprising impregnating said support with one or more chromogenic substrates of said oxidation catalyst, one or more oxidizing agents and one or more aromatic compounds capable of condensing an oxidized form of said at least one chromogenic substrate, thus making it possible to develop the colors on the support at the spot activated by the light stimulation wherein the support is a fabric comprising natural fibers or synthetic fibers.

3. The process of claim 1 or claim 2, wherein the one or more chromogenic substrates is selected from the group consisting of 3-methyl-2-benzothiazolinone (MBTH) and a phenylenediamine derivative.

4. The process of claim 1 or claim 2, wherein the one or more aromatic compounds is a mono-, di- or polycyclic aromatic compound.

5. The process of claim 1 or claim 2, wherein, wherein the aromatic compound is selected from the group consisting of a chloronaphthol, a naphthalenediol, an aminophenol, a catechol, a chlorophenol, a phenol and a guaiacol.

6. The process as claimed in claim 1, wherein said one or more oxidation catalysts of step (b) is immobilized through one or more additives on said support which is capable of bonding the one or more oxidation catalysts.

7. The process as claimed in claim 1 or claim 2, wherein when the support to be colored is a synthetic fabric said process further comprises impregnating said support with an alginate.

8. The process as claimed in claim 7, further comprising activating carboxylic functional groups of said at least one oxidation catalysts to produce activated esters and covalently attaching the at least one oxidation catalyst to said support through said activated esters.

9. The process as claimed in claim 1, further comprising drying after step (d).

10. A process for the generation of colors on a support, comprising reactivating, under the effect of a light stimulus, of an inactivated hemoglobin as one or more inactivated oxidation catalysts on the support, said inactivated hemoglobin containing at least one photolabile nitrophenyl group, said process further comprising impregnating said support with at least one chromogenic substrate of said oxidation catalyst, at least one oxidizing agent and at least one aromatic compound capable of condensing an oxidized form of said at least one chromogenic substrate thus making it possible to develop the colors on the support at the spot activated by the light stimulation, wherein the support is a flexible and transparent photoenzymatic film.

11. The process as claimed in claim 10, characterized in that the support is composed of macromolecules and carries a photoenzymatic system.

12. The process of claim 1 or claim 2, wherein the nitrophenyl group is an o-nitrobenzyl or an o-nitrophenyl group.

* * * * *